United States Patent [19]

Schimmel

[11] Patent Number: 5,529,802
[45] Date of Patent: Jun. 25, 1996

[54] PRODUCT AND METHOD FOR THE MANUFACTURE OF TEHINA SAUCE

[75] Inventor: Moshe Schimmel, Kiryat-Haim, Israel

[73] Assignee: CPC International Inc., Engelwood Cliffs, N.J.

[21] Appl. No.: 289,352

[22] Filed: Aug. 11, 1994

[30] Foreign Application Priority Data

Aug. 11, 1993 [IL] Israel ........................................ 106655

[51] Int. Cl.$^6$ ........................................................ A23L 1/39
[52] U.S. Cl. .......................... 426/589; 426/399; 426/521; 426/629
[58] Field of Search ................................... 426/399, 521, 426/589, 629

[56] References Cited

U.S. PATENT DOCUMENTS 4,640,840  2/1987  Assinder et al. ........................ 426/399

OTHER PUBLICATIONS

Chemical and Engineering News, 1950, "Concentrates" vol. 28, p. 1624.

*Primary Examiner*—Helen Pratt

[57] ABSTRACT

A method for the manufacture of tehina sauce which possesses a long shelf life without any added preservatives. The process comprises a heat treatment followed by aseptic cooling, which are applied to the paste produced from raw sesame seeds and also to the stream of the aqueous emulsion containing salt, additives and spices, followed by mixing and packaging the resulted tehina sauce product under aseptic conditions.

6 Claims, No Drawings

PRODUCT AND METHOD FOR THE MANUFACTURE OF TEHINA SAUCE

The present invention relates to a process for producing tehina sauce. More particularly, the invention relates to a process for manufacturing tehina sauce from raw tehina, also known as sesame seed paste, wherein the tehina sauce possesses a relatively long shelf life while not containing any added preservatives.

BACKGROUND OF THE INVENTION

Food processing is commonly understood to include canning, freezing and dehydrating, which permits foods to be stored for prolonged periods of time without alterating the taste, flavor or texture thereof.

The causes of food spoilage fall into two major classes: changes brought about by reactions of the food itself, and changes due to outside sources. The first type of spoilage results from the chemical reactions promoted by enzymes normally found in the particular food product. The second type is largely related to microorganisms generally present in the environment. A general method used to avoid spoilage is sterilization which comprises applying a mild thermal treatment for a specified period, thus destroying pathogenic microorganisms. However, there are many cases where sterilization, even for a short period of time, affects the taste of the treated food.

Another known method of preventing spoilage is by storing products, such as the tehina sauce product, under cool temperatures, as well as adding known food preservatives to food products to inhibit the undesired spoiling reactions. This method also has disadvantages connected with unknown reactions over time as well as possible accumulation of the preservatives in the human body.

Sesame seed, which is the starting material in the manufacture of tehina sauce, is a known oil seed which contains between from about 45% to about 63% edible oil and from about 16% to about 32% protein. In the Middle-East, the tehina is used as a seed sauce, which also contains water and additives. It is prepared from sesame seed paste, which is produced by dehulling the seeds, drying, roasting and grinding the seeds into a pourable liquid. Due to the large quantities used, tehina sauce is produced by many manufacturers in the form of an emulsion. This tehina sauce is packaged in cans, plastic or metal containers of various sizes. In order to increase the shelf life of the product, a thermal treatment, known as sterilization is applied, or various preservative additives known in the art, are introduced to the product prior to packaging. However, the taste of the resulting tehina sauce is significantly affected, and results in a lower quality product than a freshly prepared tehina paste.

Therefore, there is a long felt need to provide a new method for the manufacture of tehina sauce, which will still possess the original taste after long periods of storage.

It is an object of the present invention, to provide a new method for the manufacture of ready to eat tehina sauce, which has an extended shelf life. It is another object of the present invention, to provide a new method for the manufacture of a ready to eat tehina sauce which possesses a long shelf life, but does not contain any added preservatives.

SUMMARY OF THE INVENTION

The present invention relates to a method for the manufacture of tehina sauce which possesses a long shelf life without any added preservatives. The process comprises a heat treatment followed by aseptic cooling, which are applied to the paste produced from raw sesame seeds and also to the stream of the aqueous emulsion containing salt, additives and spices, followed by mixing and packaging the resulted tehina sauce product under aseptic conditions.

DETAILED DESCRIPTION OF THE INVENTION

The present invention relates to a process of producing a tehina sauce with an extended shelf life, and is based on the finding that the taste of a tehina sauce product is negatively affected only when the sterilization is carried out on the sesame seed paste combined with an aqueous emulsion stream. It is believed that this is a result of the particular properties of the protein present in the sesame seeds.

It was surprisingly been found that the sesame seed paste, in the absence of an aqueous emulsion, can be sterilized by heating up to about 120° C. without substantially affecting the qualities and taste of the product.

The process of the present invention comprises dehulling sesame seeds, which are then dried and roasted to the desired humidity level to form a paste. The seeds are then ground to the desired particle size, up to about 50 microns. The paste is then conveyed to a sterilization treatment, and heated up to a temperature of about 115° to 125° C. Subsequently, aseptic cooling of the sterilized sesame seed paste is carried out. Separately, an aqueous emulsion is prepared by a thorough mixing of spices. Items that can be included in the emulsion are salt, lemon juice, citric acid and garlic. The mixing is continued for the amount of time necessary in order to obtain a stable emulsion. The resulting emulsion is sterilized similarly to the paste, and subsequently conveyed to an aseptic cooler. The two cooled streams are mixed under aseptic conditions. In the final step, the tehina sauce product is packaged in the desired storage container, which can be made of known materials, such as glass, plastic or metal. The packaging is carried out under aseptic conditions.

The actual methods for carrying out the individual steps are quite simple and a person skilled in the art will be in a position to use the presently claimed invention, without significantly changing the manufacturing steps used for producing tehina sauce. However, the basic novel premise of the present invention is to carry out a separate sterilization of the ground sesame seed paste and of the aqueous emulsion comprising the desired spices.

The method will be hereinafter illustrated by the following Examples, which are presented for a better understanding of the invention. The examples are not meant to limit in any way the scope of the present invention, which is set forth in the claims.

EXAMPLE 1

100 g of dried and roasted dehulled sesame seeds containing below 1% humidity, were ground to a particle size of about 50 microns. The ground seeds were sterilized at a temperature of about 95° C. for 30 minutes and subsequently cooled under aseptic conditions.

In a separate vessel, 100 cc of water were thoroughly mixed with 10 cc of lemon juice, 1 g of citric acid, 1 g of ground garlic and 1 g of salt. The resulting emulsion was sterilized at a temperature of about 90° C. for 10 minutes followed by aseptic cooling.

The two aseptic streams were thoroughly mixed for about 5 minutes and subsequently the resulting tehina sauce was aseptically introduced into a metal can.

No substantial change was noticed in the quality of the tehina sauce produced and particularly in its taste even after one year of storage.

EXAMPLE 2

The experiment as in Example 1 was repeated using the same procedure and amounts, but the sterilization of the ground sesame seeds was carried out at a temperature of about 105° C. for twenty minutes.

The aqueous emulsion was prepared from the following ingredients:

100 cc water;

9 cc lemon juice;

2 g citric acid;

1 g garlic, and 2 g salt

The resulted emulsion was sterilized at a temperature of about 95° C. for about 10 minutes.

The two sterilized aseptic streams were thoroughly mixed for about 10 minutes and subsequently the resulted tehina sauce was aseptically introduced into a plastic vessel.

No substantial change was noticed in the quality of the tehina sauce product and particularly in its taste, even after one year of storage the taste remaining the same as that after its production.

I claim:

1. A method for the manufacture of tehina sauce which exhibits a long shelf life from sesame seed paste, which comprises, a) heating and aseptically cooling the raw sesame seed paste; b) heating and aseptically cooling an aqueous slurry comprising spices; c) mixing the paste and slurry together to form a tehina sauce; and d) packaging of the tehina sauce under aseptic conditions.

2. The method according to claim 1, wherein the heat treatments are carried out at a temperature of from about 90° C. up to about 125° C.

3. The method according to claim 1 or claim 2, which further comprises a step prior to step (c) wherein the sesame seeds are ground to a particle size of up to about 50 microns.

4. The method according to claim 1, wherein the spices comprise lemon juice, citric acid, salt and garlic.

5. The method according to claim 1, which further comprises packaging the tehina sauce product in glass, plastic or metal containers.

6. The tehina sauce product as produced in accordance with claim 1.

* * * * *